J. R. PENN.
COTTON CHOPPER.
APPLICATION FILED OCT. 21, 1915.

1,191,456.

Patented July 18, 1916.
2 SHEETS—SHEET 1.

INVENTOR
J. R. Penn
BY
John M. Spellman
ATTORNEY

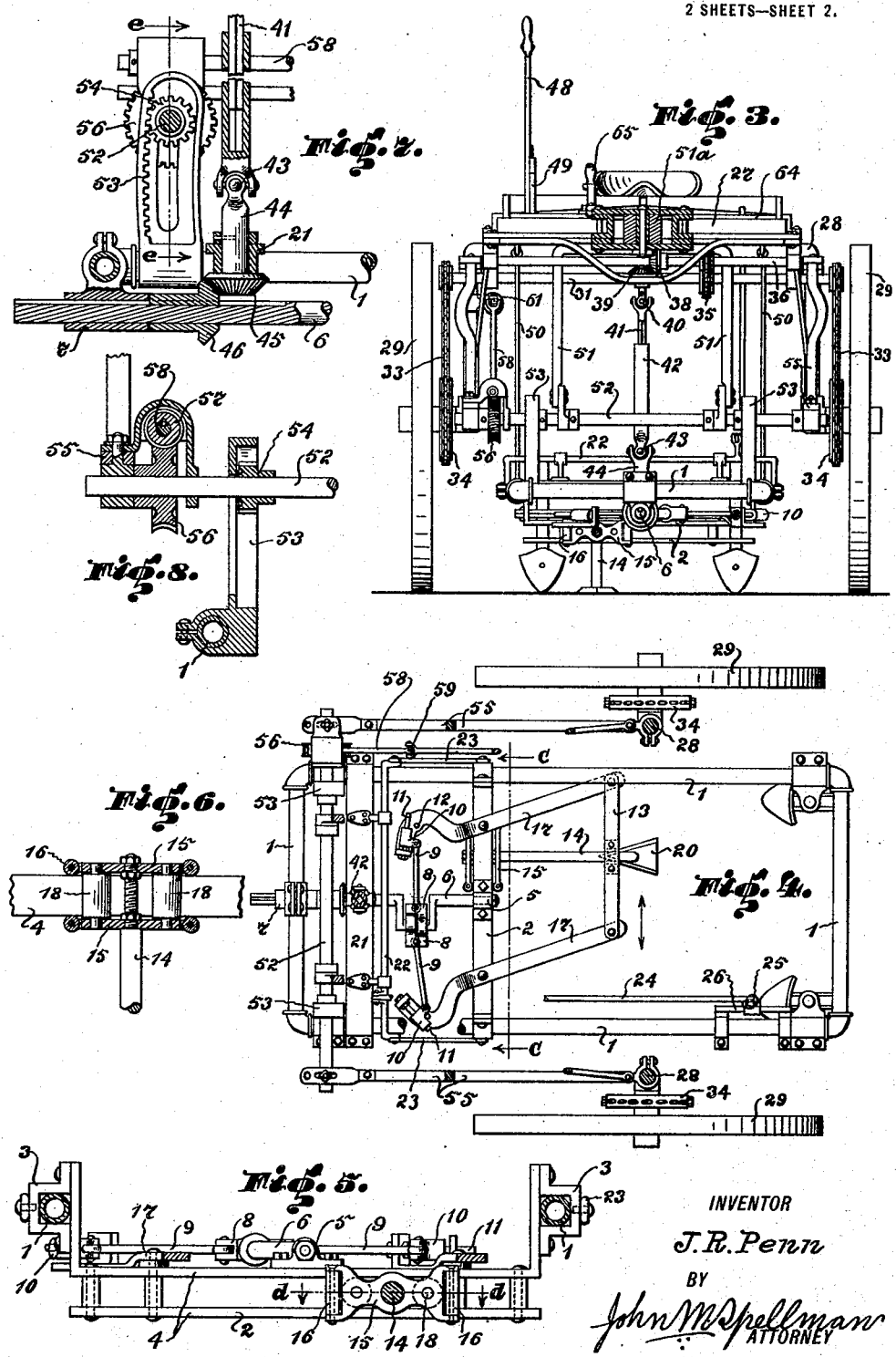

UNITED STATES PATENT OFFICE.

JOSEPH R. PENN, OF DUNCANVILLE, TEXAS.

COTTON-CHOPPER.

1,191,456.   Specification of Letters Patent.   Patented July 18, 1916.

Application filed October 21, 1915. Serial No. 57,089.

*To all whom it may concern:*

Be it known that I, JOSEPH R. PENN, a citizen of the United States, residing at Duncanville, in the county of Dallas and State of Texas, have invented certain new and useful Improvements in Cotton-Choppers, of which the following is a specification.

This invention pertains to new and useful improvements in cotton choppers.

The object of the invention is to provide certain improvements in the cotton chopper for which Letters Patent Number 1,079,577, were issued to me November 25th, 1913, and involving novel structures and arrangements of parts more particularly explained in the following specification.

A further object of the invention is to provide a chopper of superior construction which will be strong, durable and efficient, and easy of operation, also one in which the several parts will not be likely to get out of working order.

Figure 1:
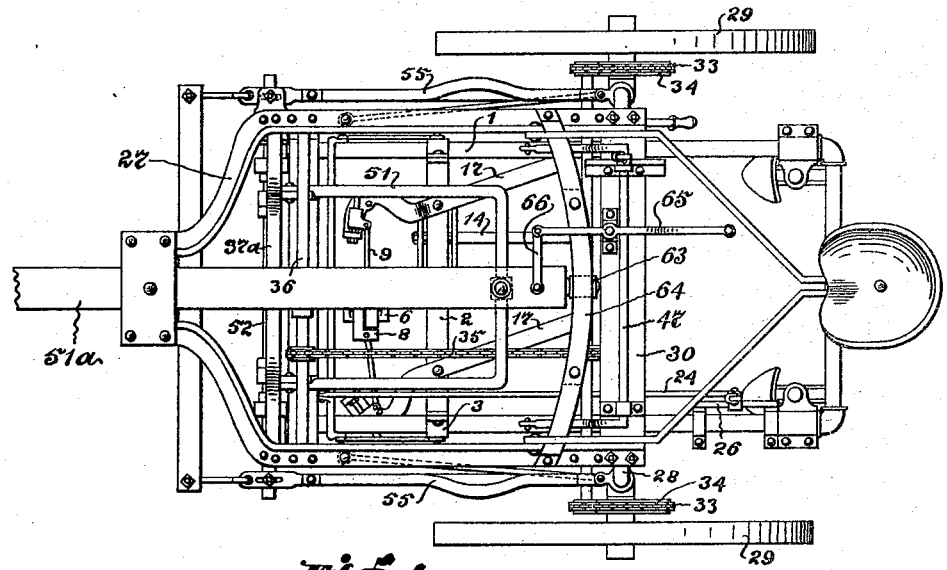
Figure 2:
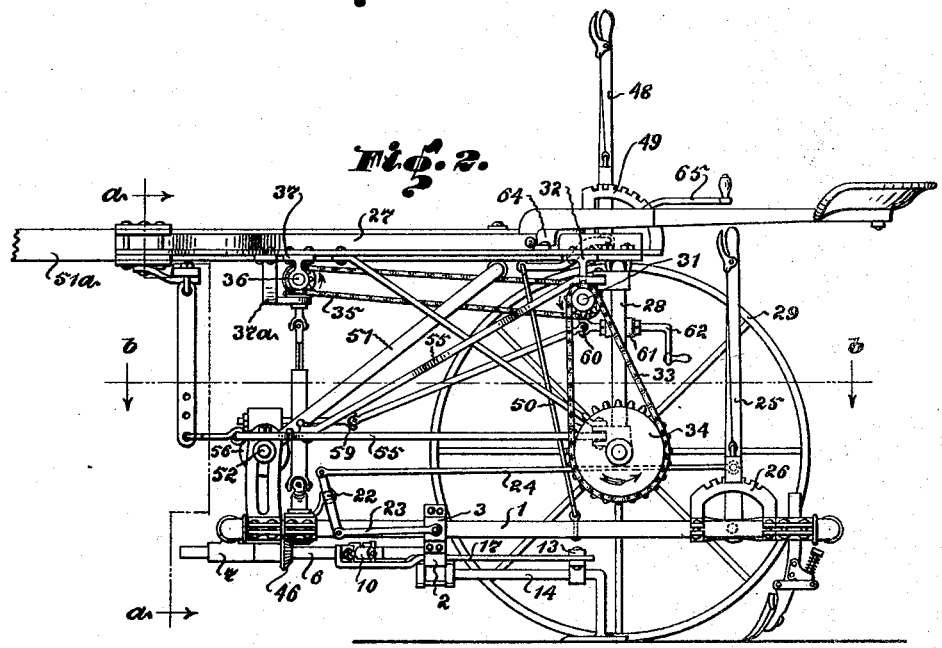

With the above and other objects in view the invention has relation to certain novel features of construction and operation, an example of which is described in the following specification and illustrated in the accompanying drawings, wherein:
Figure 1 is a plan view of the improved chopper, Fig. 2 is a side elevation of the same, Fig. 3 is a transverse vertical sectional view taken on the line $a$—$a$ of Fig. 2, Fig. 4 is a horizontal cross-sectional view taken on the line $b$—$b$ of Fig. 2, Fig. 5 is a transverse sectional view taken on the line $c$—$c$ of Fig. 4, Fig. 6 is a detail sectional view taken on the line $d$—$d$ of Fig. 5, Fig. 7 is a detail of the vertical adjusting means for the front end of the chopping frame, and Fig. 8 is a detail sectional view taken on the line $e$—$e$ of Fig. 7.

In the drawings the numeral 1 designates a rectangular horizontal chopping frame disposed longitudinally of the machine. Nearer the forward end of the frame 1 a hanger 2 is disposed transversely thereof and supported by boxes 3 slidable on the side bars of said frame. The hanger is composed of a pair of superposed bars 4 as shown in detail in Fig. 5.

At the center of the hanger a bearing box 5 is fixed and a longitudinal central crank shaft 6 has its rear end rotatably confined in the box; while its forward end is slidable in a box 7 depending from the frame 1 as shown in detail in Fig. 7. A pair of ears 8 are hinged on the crank shaft 6 and project in opposite directions. These are pivoted to the inner ends of links 9 having their outer ends pivoted to blocks 10 sliding on horizontal pins 11 fixed on and overhanging shifting levers 17 pivoted intermediate their ends on the hanger 2. The forward ends of the levers 17 are curved as shown so that the pins 11 may be held in the general direction of the path traversed by the links 9, whereby the blocks will slide freely until encountering either a stud 12 carried by each lever or the head of the pin when a swing of the levers will be effected. The reason for this mechanism is obvious and an explanation is considered unnecessary.

The rear ends of the levers are adapted to swing under the frame 1 and are pivoted to a cross bar 13 from the center of which a hoe bar 14 is carried. The bar 13 and 14 are shifted transversely of the frame 1 by the levers. The bar 14 is bent as shown, its rear end depending and carrying a flat triangular hoe 20; while its forward end in a carriage 15 sliding transversely of the frame and mounted on rollers 18 in the hanger 2 between the bars 4. The carriage has vertical bearing rollers 16 engaging the edges of the bars 4 as shown in Figs. 5 and 6. The hoe has a planetary movement transversely through the row of plants and the carriage slides in harmony with the shifting bars 13 and 14, whereby the latter is maintained parallel with the longitudinal axis of the chopper.

Where the "stand" is thin and for other reasons it may not be desired to cut out the plants standing in the path of the hoe, and for accomplishing this the hanger 2 is adjusted forward or rearward on the frame 1, the shaft 6 sliding in the box 7. For adjusting the hanger a support 21 is fastened on the forward extremity of the frame 1 and pivotally supports a transverse yoke 22 having its depending ends pivoted to links 23 connected with the boxes 3. The yoke is swung by a rod 24 which has its rear end pivoted on a vertical lever 25 pivoted on a locking segment 26 fastened on the frame 1. It is apparent that by swinging the lever 25 the hanger 2 and its chopping mechanism may be moved forward or rearward at will.

The frame 1 is suspended from a main frame 27 mounted on an arched axle 28. The axle is supported in ground wheels 29. A transverse supporting plate 30 connects the rear ends of the main frame over the axle. A suitably shaped yoke 47 is hinged on the plate 30 and is swung by an upright lever 48 engaging a locking segment 49. Rods 50 hinged to the ends of the yoke have their lower ends pivoted to and supporting the rear portion of the frame 1. The forward end of the frame 1 is pivotally supported as hereinafter described. By swinging the lever 48 the frame 1 is swung up and down on its forward pivot; thus being adjusted and the depth of the cut regulated.

A counter shaft 31 is hung in front of the plate 30 in bearing brackets 32 hanging from the frame 27. This shaft is driven by sprocket chains 33 running up from sprockets 34 fastened to the hubs of the wheels 29. A chain 35 running forward from the shaft 31 drives a transverse jack shaft 36 at the forward end of the main frame. The jack shaft is supported in brackets 37 depending from the frame 1.

A transverse hanger 37a adjacent the jack shaft supports a miter gear 39 driven by a miter gear 38 fixed on said shaft. A universal joint 40 connects the gear 39 with a square shaft 41 telescoping into a sleeve 42 having a universal joint 43 at its lower end. The joint 43 forms a connection with a stub shaft 44 mounted in the support 21 and having a miter pinion 45 mounted on its lower end. The pinion 45 meshes with a mate 46 splined on the crank shaft 6 and rotating the same. Motion is transmitted from the ground wheels to the crank shaft by the mechanism just described, the universal joints and telescoping shaft permitting the various adjustments.

A tongue 51a is pivoted in the forward end of the frame as shown in section in Fig. 3 and has its rear end terminating adjacent the plate 30 and adapted to swing laterally of the frame 27. A yoke shaped hanger 51 fastened centrally to the under side of the rear end of the tongue inclines downward and forward to a transverse adjusting shaft 52 to which it is connected so as to shift said shaft laterally, but to permit the shaft to rotate. Pinions 54 fixed on the shaft 52 are disposed within racks 53 having internal gear teeth as shown in Fig. 7.

The shaft 52 is supported by brackets 55 hinged on the axle 28. By rotating the shaft 52 the racks 53 are raised or lowered and being connected to the frame 1, the latter thus has its forward or pivoted end raised or lowered, whereby the angle at which the hoe 20 strikes the row is controlled. For rotating the shaft 52 a worm screw 57 is provided to mesh with a worm gear 56 fixed on the shaft. As shown in Fig. 8 the screw is revolved by a shaft 58 including universal joints 59 and 60 and having connection with a crank 62 mounted in a boxing 61 fastened on the axle 28.

From the rear end of the tongue a roller 63 projects into a segmental guide member 64 mounted transversely of the frame 27. For swinging the tongue laterally a handle lever 65 is pivoted on the plate 30 and has its forward end connected by a link 66 with the tongue. It will be seen that swinging the lever 65 the rear end of the tongue will be shifted to one side or the other. When the tongue is shifted the hanger 51 will be likewise shifted, whereby the forward end of the frame 1 is also shifted. Thus if the row is crooked or the "stand" is out of line the hoe can be brought to the plants by shifting the lever 65.

It will be apparent that as the machine is drawn along a row of plants the hoe will be swung from side to side, cutting through the row transversely and at a slight angle due to the forward movement of the machine. The machine will move sufficiently while the hoe is reversing to leave a space between the cuts of the hoe, and the plants left in these spaces constitute the "stand" after the machine has passed along the row. The various adjustments are obvious and need no further explanation.

The invention is presented as including all such modifications and changes as properly come within the scope of the appended claims.

What I claim, is:

1. In a cotton chopper, the combination of a main frame, a chopping frame mounted under the main frame, means for shifting the forward end of the chopping frame laterally independently of the main frame, an adjustable pivotal support for the forward end of the chopping frame, means for raising and lowering the rear portion of the chopping frame, a hanger slidable forward and rearward on the chopping frame, a transversely shifting hoe carried by the hanger, means for shifting the hoe mounted on the hanger, means for sliding hanger, and a driving connection extending from the main frame to the hoe shifting means including devices compensating the independent adjustments of the frame and their parts.

2. In a cotton chopper, the combination of a main frame supported on ground wheels, a chopping frame suspended below the main frame, a sliding hanger mounted across the chopping frame, a lever for sliding said hanger longitudinally of the frames, shifting elements mounted on the hanger, a hoe suspended from the said elements, a crank shaft in fixed relation to the hanger and having one end carried thereby, the other end of the crank shaft slidable on the chopping frame, connections between the crank shaft and the shifting elements, and means for transmitting rotation from the ground wheels to the crank shaft.

3. In a cotton chopper, the combination with a portable main frame, of a chopping frame suspended under the main frame, a slidable hanger adjustable longitudinally of the chopping frame and extending across the said frame, a slidable crank shaft connected with the hanger, laterally swinging shifting elements carried by the hanger, operating connections between the crank shaft and the shifting elements, a hoe carried by the elements, and means for transmitting motion from the main frame to the crank shaft.

4. In a cotton chopper, the combination with a main frame mounted on ground wheels, of a chopping frame suspended under the main frame, a slidable hanger adjustably mounted on the chopping frame so as to move forward and rearward, means for adjusting the chopping frame with relation to the main frame, a slidable crank shaft connected with the hanger, a pair of levers mounted on the hanger, links extending from the crank shaft to the forward ends of the levers, compensating connections between the outer ends of the links and the levers, a connection between the rear ends of the levers, a hoe suspended from said connection, and means for transmitting motion from the ground wheels to the crank shaft.

5. In a cotton chopper, the combination with a main frame mounted on ground wheels, and a chopping frame disposed under the main frame; of a hanger slidable longitudinally of the chopping frame, a hoe support having its rear end suspended, operating mechanism mounted on the hanger and connected with the rear end of the hoe support whereby said support is shifted laterally of the hanger and the frames, a hoe mounted on the rear end of the support, and a carriage slidable on the hanger transversely of the chopping frame and connected with the forward end of the hoe support whereby said support is maintained parallel with the longitudinal axis of the chopping frame.

In testimony whereof I have signed my name to this specification.

JOSEPH R. PENN.

Copies of this patent may be obtained for five cents each, by addressing the "Commissioner of Patents, Washington, D. C."